United States Patent [19]

McMahon

[11] Patent Number: 5,173,951
[45] Date of Patent: Dec. 22, 1992

[54] WORD ORIENTED IMAGE SMOOTHING APPARATUS AND METHOD

[75] Inventor: Donald H. McMahon, Gasevoort, N.Y.

[73] Assignee: Unisys Corporation, Blue Bell, Pa.

[21] Appl. No.: 774,484

[22] Filed: Oct. 10, 1991

[51] Int. Cl.$^5$ .............................................. G06K 9/44
[52] U.S. Cl. ........................................ 382/54; 382/49; 382/51
[58] Field of Search ............................. 382/54, 49, 51; 358/463, 465, 447; 235/61 A; 395/129

[56] References Cited

U.S. PATENT DOCUMENTS

| | | | |
|---|---|---|---|
| 4,298,895 | 11/1981 | Arai et al. | 382/51 |
| 4,805,226 | 2/1989 | Guebey | 382/54 |
| 4,949,390 | 8/1990 | Iverson et al. | 382/49 |
| 4,962,542 | 10/1990 | Klees | 382/54 |
| 4,979,136 | 12/1990 | Weiman et al. | 382/51 |

Primary Examiner—Michael T. Razavi
Assistant Examiner—Steven P. Klocinski
Attorney, Agent, or Firm—Albert B. Cooper; Mark T. Starr

[57] ABSTRACT

An image to be smoothed is represented by a matrix of pixels arranged in a plurality of adjacent scan lines. Each pixel under examination is changed to the value of a predetermined number of pixels in a 3×3 pixel neighborhood surrounding the pixel under examination. The image pixels are represented by a sequence of 16 bit digital words, each bit representing a corresponding pixel. The bits of three adjacent words on three adjacent scan lines are accumulated in 16 counters, respectively, with the words shifted so that the 9 bits of each of sixteen 3×3 neighborhoods are simultaneously accumulated in the sixteen counters. Each counter is constructed so that when a predetermined number of ONEs is accumulated from the 3×3 neighborhoods, the most significant counter stage goes to ONE and remains at ONE irrespective of further accumulation. One of the three words is the word to be smoothed. The most significant stages of the sixteen counters contain the smoothed word corresponding to the word to be smoothed.

9 Claims, 4 Drawing Sheets

WORD ORIENTED IMAGE SMOOTHING APPARATUS AND METHOD

BACKGROUND OF THE INVENTION

1. Field of the Invention

The invention relates to image processing, particularly with respect to smoothing an image represented as a matrix of digitized picture elements (pixels).

2. Description of the Prior Art

Image smoothing is commonly performed in image processing technology for such applications as pattern recognition, optical character recognition, map correlation, optical inspection and the like. In known image smoothing algorithms, each pixel is processed, one at a time, by examining the pixel environment comprising the pixels in a predetermined neighborhood thereof. Depending on the statistics of the pixels in the neighborhood, including the pixel under processing, the pixel under processing is altered in accordance with whether the statistics of the pixels in the neighborhood exceed a predetermined threshold. For example, the nine pixels in a square centered on the pixel under processing may be averaged and the average value substituted for the pixel under processing. In a binary image pattern, the center pixel may be forced to a value of ONE or ZERO if the majority of the nine pixel elements in the square neighborhood is ONE or ZERO, respectively. Alternatively, the neighborhood may comprise the pixels immediately above and below, and immediately to the right and left of the pixel under processing. Another arrangement may be to utilize the five pixels comprising the pixel under processing and the four diagonally adjacent pixels.

Image smoothing traditionally is performed digitally by reading the image into the processor memory as digital data and performing the smoothing as a software processing routine on the data. A typical type of smoothing operation on a binary image pattern was described above, where each 3×3 picture element subarray of the image is examined and the central element forced to a value of ONE or ZERO if the majority of the nine elements is ONE or ZERO, respectively. The majority decision is the only averaging algorithm possible with binary information. Other smoothing procedures may, however, be utilized. For example, rather than forcing the central picture element to ONE if five or more of the nine elements are ONE and to a value of ZERO otherwise, the procedure can be generalized to force the central element to ONE if and only if N or more of the nine elements have the value ONE. A value of N less than five allows the areas of ONE's to expand, whereas a value greater than five forces the ONE areas to contract. If the black areas of the image (i.e. the ONE's) are small compared to the white areas (ZERO's) or if the noise to be smoothed is predominantly ZERO's embedded in ONE's, a value of N=4 is likely to be more optimal for smoothing than a value of N=5. If the ONE areas predominate over the ZERO areas, then a value of N=6 might be more optimal for smoothing. The image may be a two-dimensional image represented by a total of 1024 by 1024 pixels arranged in digital storage as a scanned sequence of 65,536 sixteen bit words.

Such prior art image smoothing procedures tend to be exceedingly slow since the pixel environments are sequentially examined, one element at a time. Such prior art image smoothing techniques utilizing a digital computer necessarily involve time consuming bit shifting routines. Alternatively, hard wired electronic circuitry may be constructed to perform these functions. Although such circuitry tends to be faster than software equivalents, such devices tend to be complex and hence expensive.

SUMMARY OF THE INVENTION

The disadvantages of the prior art are obviated by an apparatus for smoothing a two dimensional image represented by a matrix of pixels arranged in a plurality of adjacent scan lines, each pixel having a predetermined neighborhood of adjacent neighboring pixels. The pixels of the matrix are represented by a sequence of digitally stored words having N bits each, each bit representing a corresponding pixel of the matrix. An N-bit register holds an N-bit word and N counters responsive to the N bits of the register, respectively, accumulate ONE's existing in the N bits of the register. Each of the N counters is constructed and arranged so that the most significant stage thereof goes to ONE when the counter has accumulated a predetermined number of ONE's and remains at ONE irrespective of further accumulation of ONE's. Control means is operative to load a word under examination into the register, the word representing N pixels under examination. The control means is further operative to load further words into the register representing pixels adjacent the pixels under examination on adjacent scan lines. The words are shifted, so that ONE's representing the pixels under examination and the pixels in a predetermined neighborhood of each pixel under examination are simultaneously accumulated in the N counters, respectively.

In the preferred embodiment, when a word is shifted relative to the counters, bits from the adjacent word on the scan line are shifted into the register to maintain the information at the word boundaries correct.

DESCRIPTION OF THE PREFERRED EMBODIMENTS

As discussed above, the embodiments of the invention will be described in terms of a two-dimensional image to be smoothed represented by a total of 1024 by 1024 pixels arranged in digital storage as a scanned sequence of 65,536 sixteen bit words. Each adjacent set of 64 words contains the binary information for one scan line of the image, with the most significant bit of any word of the image representing the left most portion of the binary image information contained in that word. Let W refer to the relative index value of the image I stored in memory from memory location I to memory location I+65,536. Then I(W), I+64(W), I+128(W), ... represent vertically adjacent word sized portions of the image and I(W), I+2(W), I+4(W), ... represent horizontally adjacent word sized portions of the image. The index increases by two when utilizing a processor having byte addressing capability.

A program for prior art software smoothing will now be described in terms of an assembly language as follows:

| ASSEMBLY LANGUAGE MNEMONIC DEFINITIONS | |
|---|---|
| CLR | CLEAR REGISTER |
| ADDR | REGISTER TO REGISTER ADD |
| SUBR | REGISTER TO REGISTER SUBTRACT |
| ADDI | ADD IMMEDIATE VALUE |
| CMPI | COMPARE IMMEDIATE VALUE |
| LDR | REGISTER TO REGISTER LOAD |
| LD | LOAD FROM MEMORY |
| ST | STORE TO MEMORY |
| BP | BRANCH ON PLUS TO LABEL LOCATION |
| BM | BRANCH ON MINUS TO LABEL LOCATION |
| BNM | BRANCH ON NON-MINUS TO LABEL LOCATION |

I+d(W) references memory at address location I+d+CONTENTS OF W and I(W) REFERENCES MEMORY AT ADDRESS LOCATION I+CONTENTS OF W.

| PRIOR ART PROGRAM FOR 5 OF 9 BINARY IMAGE SMOOTHING | | |
|---|---|---|
| | CLR W | CLEAR WORD INDEX W |
| | CLR A1 | CLEAR COLUMN SUBTOTAL SUM |
| | CLR A2 | CLEAR COLUMN SUBTOTAL SUM |
| MORE | LD S,15 | LOAD 15 INTO SHIFT COUNT REGISTER |
| | CLR A0 | CLEAR LAST 3 by 3 PIXEL SUM |
| | LD T,I(W) | LOAD TOP WORD FROM MEMORY |
| | BNM P1 | BRANCH IF NON MINUS TO P1 |
| | ADDI A0,1 | ADD 1 TO A0 IF MINUS |
| P1 | ST A,I-2(W) | STORE AVERAGED IMAGE VALUE |
| | CLR A | CLEAR AVERAGE OF IMAGE |
| | LD M,I+64(W) | LOAD MIDDLE WORD FROM MEMORY |
| | BNM P2 | BRANCH IF NON MINUS TO P2 |
| | ADDI A0,1 | |
| P2 | LD B,I+128(W) | LOAD BOTTOM WORD FROM MEMORY |
| | BNM P3 | |
| | ADDI A0,1 | |
| P3 | ADDR A2, A0 | ADD REGISTER A0 TO A2 |
| | ADDR A2, A1 | |
| | CMPI A2,5 | COMPARE VALUE OF A2 WITH 5 |
| | BM P4 | BRANCH ON MINUS TO P4 |
| | ADDI A,1 | SET ONE BIT IN SMOOTHED IMAGE |
| P4 | LDR A2,A1 | PUT VALUE OF A1 IN A2 |
| | LDR A1,A0 | |
| SHIFT | CLR A0 | |
| | ADDR A,A | ADD AVERAGE REGISTER TO ITSELF TO SHIFT LEFT ONE BIT |
| | ADDR T,T | |
| | BNM P5 | |
| | ADDI A0,1 | |
| P5 | ADDR M,M | |
| | BNM P6 | |
| | ADDI A0,1 | |
| P6 | ADDR B,B | |
| | BNM P7 | |
| | ADDI A0,1 | |
| P7 | ADDR A2, A0 | |
| | ADDR A2, A1 | |
| | CMPI A2,5 | |
| | BM P8 | |
| | ADDI A,1 | |
| P8 | LDR A2,A1 | |
| | LDR A1,A0 | |

| PRIOR ART PROGRAM FOR 5 OF 9 BINARY IMAGE SMOOTHING -continued | |
|---|---|
| SUBI S,1 | SUBTRACT ONE FROM SHIFT COUNT |
| BP SHIFT | BRANCH ON PLUS TO SHIFT |
| ADDI W,2 | ADD 2 TO BYTE ORIENTED INDEX VALUE |
| CMPI W, 65536-128 | ARE ALL WORDS OF IMAGE PROCESSED? |
| BM MORE | IF NOT BRANCH BACK TO MORE |

Basically, this prior art program functions by shifting words for three adjacent lines in the image one position to the left and accumulating the sum total of 1's (i.e. negative values) corresponding to a 3 by 3 pixel array. After fifteen shifts have occurred, new data is entered so that the complete image is processed sequentially picture element by picture element and scan line by scan line. The procedure cycles through the cylindrically folded image without distinguishing between left and right margin words. This approach does not have deleterious effects if both left and right margins of the image have the same binary value.

It is appreciated that the above described prior art program operates on a bit by bit processing level and is slow because each shift position typically occupies about 40 microseconds to process. Each word then requires 16 times 40 or 640 microseconds. Therefore, 42 seconds are required to process 65,000 words. An entire page of material to be digested by, for example, an optical character recognition reader contains even more data, approximately 2000 by 3000 pixels, and thus requires more than four minutes to smooth.

The present invention will be explained in terms of software and hardware embodiments and involves a word oriented processing technique, rather than a bit processing technique. The present invention will provide a speed advantage compared to the above described prior art if a word of image data is smoothed in a time shorter than 640 microseconds. As will be described, approximately an order of magnitude improvement is achieved. Additionally, a word oriented processing technique in accordance with the invention is twice as fast on a 32 bit processor as on a 16 bit processor of the same speed. Furthermore, the speed of a 32 bit processor will be yet another factor of two faster than a 16 bit machine because half the number of memory accesses are required to fetch instructions and memory addresses.

The principle of the word oriented processing technique for smoothing will now be explained. Let S1, S2, and S3 be 16 bit words representing, bit by bit, the first, second, and third significant digits, respectively, of the sum value of a pixel array surrounding the pixel under examination, with S1 being the least significant and S3 being the most significant. In other words, the corresponding bits of S1, S2, and S3 form each of the 16 sum values. In the described embodiments the predetermined neighborhood is a 3 by 3 pixel array with the pixel under examination at the center thereof. As an example, if $S1 = FC35 = 1111\ 1100\ 0011\ 0101$ $S2 = C3D7 = 1100\ 0011\ 1101\ 0111$ $S3 = 749E = 0111\ 1010\ 1001\ 1110$ then the sum value of the picture element in the fifth position from the left end of the word is 101=5. Thus, S3 contains, bit by bit, the most significant digit of the 16 sum values for the 16 pixels being smoothed. In order to examine a 3 by 3 pixel array surrounding each pixel being smoothed, nine appropriate 16 bit words are accumulated in S1, S2, and S3, where W is one of the nine 16 bit words whose sum values are to be accumulated, bit by bit, in S1, S2, S3. If x represents a bit by bit logical AND operation and $\oplus$ represents a bit by bit logical EXCLUSIVE OR operation, the required sequence of steps is represented by the following sequence of equations.

$$S1' = S1 \oplus W$$
$$C1 = S1 \times W$$
$$S2' = S2 \oplus C1 \quad (1)$$
$$C2 = S2 \times C1$$
$$S3' = S3 + C2$$

The primed values S1', S2' and S3' represent the updated values of S1, S2, and S3, respectively, obtained by adding W to the least significant bit word S1 and propagating the carries through to S3. C1 represents the bit by bit first digit carry bit information and C2 represents the bit by bit second digit carry bit information. For example, if the same corresponding bits of S1 and W are both ONE, then that bit is set in C1 and used to update the value of S2. Similarly, if S2 is ONE, the next higher level carry bit in C2 is also set and utilized to update S3.

For 4 out of 9 smoothing, the last equation of Equations (1) is the OR operation rather than the EXCLUSIVE OR operation so that once set, this bit is not reset to zero irrespective of further accumulations of ONE's. Thus, each bit of S3 remains in the ONE state once set and hence indicates whether or not four or more of the bits of the 3 by 3 array are set. The value of S3 is the desired smoothed binary image information corresponding to the word under processing.

Smoothing, utilizing a 5 out of 9 algorithm proceeds via the following sequence.

$$S1' = S1 \oplus W$$
$$C1 = S1 \times W$$
$$S2' = C1 \oplus S2$$
$$C2 = S2 \times C1 \quad (2)$$
$$S3' = S3 + C2$$
$$C3 = S3' \times S1'$$
$$S4' = S4 + C3$$

The C3 equation determines if both the first and third bits are set and the S4 equation sets a bit in S4 if C3 is set. S4 is the output register and contains the smoothed word. The counts in S1, S2, and S3 are irrelevant after the S4 bit is set. Prior to smoothing word, S4 is cleared (i.e. S4 = S4 $\oplus$ S4) as well as S1, S2 and S3. It is appreciated that other sequences may be utilized for 6 out of 9 smoothing of for yet different values of N.

Further details of the preferred embodiment of the invention will be explained in terms of 4 out of 9 smoothing. In addition to the sequence delineated in Equations (1), a properly aligned set of nine words is formed that are sequentially added to S1, S2, and S3, as described above with respect to the word W, in order to accumulate the 3 by 3 bit array information at each bit position of the smoothed image.

One procedure for obtaining the properly aligned nine words of data is as follows. After clearing S1, S2, S3, the image word I(W) is fetched from memory and placed in a working register R. The sequence delineated in Equations (1) is applied. As a second step, the contents of R is shifted, for example, one bit to the left and the highest order bit from the next memory location I+2(W) is entered into the lowest order bit position of R to provide correct information at the word boundary. This left shifted and boundary corrected word is then processed by Equations (1). As a third step, the value of R is shifted right two positions and the least two significant bits of the memory word I−2(W) is entered into the two most significant bit positions of R. This right shifted and boundary corrected value of R is then accumulated via Equations (1). In a similar manner, the remaining six contributions are accumulated by fetching data from memory locations spaced vertically down in the image by one and two scan lines, respectively. It is appreciated that the shifting sequence may be differently performed to the same effect. For example, three consecutive left shifts may be utilized to accumulate the bits of the 3 by 3 matrices with appropriate boundary corrections effected. The above delineated operations are explained in terms of 9 words. However, it is appreciated from the above, that 3 words are used for each complete smoothing accumulation sequence where each of the words is shifted twice (with boundary correction) to form with the 9 words processed in the working register.

The specific steps that can be performed in a minimum amount of time to accomplish right and left shifting or the equivalent thereof as well as boundary edge correction, vary considerably with the processor architecture, instruction repertoire and instruction execution times. Most processors have a sufficient number of working registers such that a time savings results if Equations (1) or (2) are performed in the working registers. The Interdata 70 and Motorola 68000 are two such processors. Sometimes, as in the Interdata 70, a register-to-register add operation is significantly faster than a shift left or a shift right by one bit operation. Almost all processors have an extended add or add with carry instruction that adds the previous carry bit to the next add operation (useful for multiprecision arithmetic). A sequence of steps appropriate to the Interdata 70 processor is as follows:

| INTERDATA 70 SUBROUTINE PROGRAM TO PERFORM EQS (1) PROCESSING | | |
|---|---|---|
| SUM | LHR T0,R0 | LOAD R0 INTO TEMPORARY REGISTER T0 (R0 CONTAINS W) |
| | LHR T1,S1 | LOAD S1 INTO TEMPORARY REGISTER T1 |
| | XHR S1,T0 | PERFORM EXCLUSIVE OR TO UPDATE S1 |
| | NHR T0,T1 | USE AND OPERATION TO GET C1 IN REGISTER T0 |
| | LHR T1,S2 | |
| | XHR S2,T0 | UPDATE S2 |
| | NHR T0,T1 | GET C2 VALUE IN REGISTER T0 |
| | OHR S3,T0 | USE OR OPERATION TO UPDATE S3 |

| | -continued | |
|---|---|---|
| | BR RET | BRANCH BACK TO SMOOTHING ROUTINE |
| | INTERDATA 70 PROGRAM FOR WORD ORIENTED SMOOTHING (4 OUT OF 9) | |
| | LCS W,2 | INITIALIZE INDEX VALUE W TO −2 |
| LOOP | AIS W,2 | ADD 2 TO REGISTER W TO INDEX NEXT MEMORY WORD |
| | LHR R0,R2 | MOVE CONTENTS OF R2 TO R0 |
| | LH R2,I(W) | LOAD R2 FROM I(W) MEMORY LOCATION |
| | LHR R1,R2 | MOVE VALUE OF R2 TO R1 |
| | BAL RET, | BRANCH TO EQS(1) |
| | SUM | ACCUMULATION PROCESSING (SUBROUTINE SUM) |
| | AHR R1,R1 | ADD R1 TO ITSELF CAUSING A LEFT SHIFT |
| | ACHR R0, R0 | ADD R0 TO ITSELF AND ADD PREVIOUS CARRY BIT |
| | BAL RET, SUM | |
| | AHR R1,R1 | |
| | ACHR R0,R0 | |
| | BAL RET, SUM | |
| | LHR R0,R3 | START PROCEDURE FOR SECOND LINE |
| | LH R3,I+64(W) | |
| | LHR R1,R3 | |
| | BAL RET, SUM | |
| | AHR R1,R1 | |
| | ACHR R0,R0 | |
| | BAL RET, SUM | |
| | AHR R1,R1 | |
| | ACHR R0,R0 | |
| | BAL RET, SUM | |
| | LHR R0,R4 | START PROCEDURE FOR THIRD LINE |
| | LH R3,I+128(W) | |
| | AHR R1,R1 | |
| | ACHR R0,R0 | |
| | BAL RET, SUM | |
| | AHR R1,R1 | |
| | ACHR R0,R0 | |
| | BAL RET, SUM | |
| | STH S3,I(W) | STORE SMOOTHED WORD VALUE IN MEMORY |
| | XHR S1,S1 | CLEAR S1 (EXCLUSIVE OR OPERATION) |
| | XHR S2,S2 | |
| | XHR S3,S3 | |
| | CHI W, 65, 384 | COMPARE INDEX VALUE TO SEE IF ALL IMAGE PROCESSED |
| | BM LOOP | BRANCH BACK ON MINUS TO CONTINUE PROCESSING |

In order to effect a further speed enhancement, the steps of the subroutine SUM could be written out repeatedly nine times to save the time of the branch to subroutine and subroutine return branch steps. The execution time on the Interdata 70 processor is approximately 100 microseconds for a 16 bit word or 6.5 seconds for a 65,384 word image (1024 by 1024 pixels). The delineated Interdata 70 program is therefore approximately seven times faster than the prior art bit by bit smoothing approach described above. As previously discussed, additional speed advantages are obtainable on processors utilizing 32 or 64 bit words.

The Motorola 68000 supports 32 bit word operations. A partial description of program steps therefor proceeds as follows.

| | |
|---|---|
| MOVE.L I(W),D0 | MOVE A 32 BIT WORD TO REGISTER D0 FROM MEMORY |
| BSR SUM | BRANCH TO SUBROUTINE SUM |
| LSR.L 1,D0 | SHIFT 32 BIT WORD RIGHT ONE BIT |
| BSR SUM | |
| LSR.L 1,D0 | |
| BSR SUM | |

This set of steps is then repeated for the next two data lines. The subroutine SUM is assumed to operate on only the 16 least significant bits of register D0. The processing steps for SUM are the same as delineated above for the Interdata 70 program although the mnemonics are different. The Motorola 68000 operating at a clock frequency of 8 MHz is approximately twice as fast as the Interdata 70 and hence can smooth a 1024 by 1024 image in about 3.5 seconds. Present day 286 and 386 based processors will, of course, perform significantly faster.

The above described embodiments of the invention were explained in terms of binary image smoothing where each pixel is either on or off. The processing techniques of the present invention are also applicable to the smoothing of gray scale images. Gray scale image data acquired and digitized in real time are generally stored in a set of words containing a bit by bit representation of intensity level data. If there are 16 levels of gray information, a set of four words of 16 bits each is required to store the information for 16 picture elements. Let one such set be designated by the words W1, W2, W3, W4, with W4 carrying the most significant bit information and W1 the least significant bit information. In a manner A similarly to the binary image smoothing described above, the smoothed data is accumulated in a set of registers S1, S2, S3, S4, S5, and S6, where S6 carries the most significant sum bit and S1 carries the least significant sum bit. The averaging is performed over a 2 by 2 pixel array. The sequence of steps for performing such word oriented gray scale image smoothing are illustrated as Equations (3) as follows.

| EQUATIONS (3) - SEQUENCE OF STEPS TO SMOOTH 4 BIT GRAY SCALE IMAGE DATA |
|---|
| $S1 = S1 \oplus W1$ |
| $C1 = S1 \times W1$ |
| $S2 = S2 \oplus C1$ |
| $C2 = S2 \times C1$ |
| $S3 = S3 \oplus C2$ |
| $C3 = S3 \times C2$ |
| $S4 = S3 \oplus C3$ |
| $C4 = S3 \times C3$ |
| $S5 = S5 \oplus C4$ |
| $C5 = S5 \times C4$ |
| $S6 = S5 + C5$ |
| $S2 = S2 \oplus W2$ |
| $C2 = S2 \times W2$ |
| $S3 = S3 \oplus C2$ |
| $C3 = S3 \times C2$ |
| $S4 = S4 \oplus C3$ |
| $C4 = S4 \times C3$ |
| $S5 = S5 \oplus C4$ |
| $C5 = S5 \times C4$ |
| $S6 = S6 + C5$ |
| $S3 = S3 \oplus W3$ |
| $C3 = S3 \times W3$ |
| $S4 = S4 \oplus C3$ |
| $C4 = S4 \times C3$ |

-continued

EQUATIONS (3) - SEQUENCE OF STEPS TO SMOOTH 4 BIT GRAY SCALE IMAGE DATA $$S5 = S5 \oplus C4$$
$$C5 = S5 \times C4$$
$$S6 = S6 + C5$$
$$S4 = S4 \oplus W4$$
$$C4 = S4 \times W4$$
$$S5 = S5 \oplus C4$$
$$C5 = S5 \times C4$$
$$S6 = S6 + C5$$

The word W1 is entered at the lowest bit level S1, the word W2 is entered at the next higher S2 bit level, etc., with carries propagating to higher bits. It is appreciated that the registers S3, S4, S5, S6 contain the averaged information in a format equivalent to the unsmoothed data W1, W2, W3, W4. That is, the divide-by-four operation is equivalent to a two bit shift in level from W4 as the most significant bit to S6 as the most significant bit of the averaged value. The four words S3, S4, S5, S6 are therefore outputted back to memory in place of the unsmoothed data W1, W2, W3, W4. It is noted that the data has been shifted one bit to the right, a result that is unimportant for most applications. The net shift of one position can, however, be eliminated by alternative computational procedures such as a shift right and a shift left of the data before processing.

Figure 1:
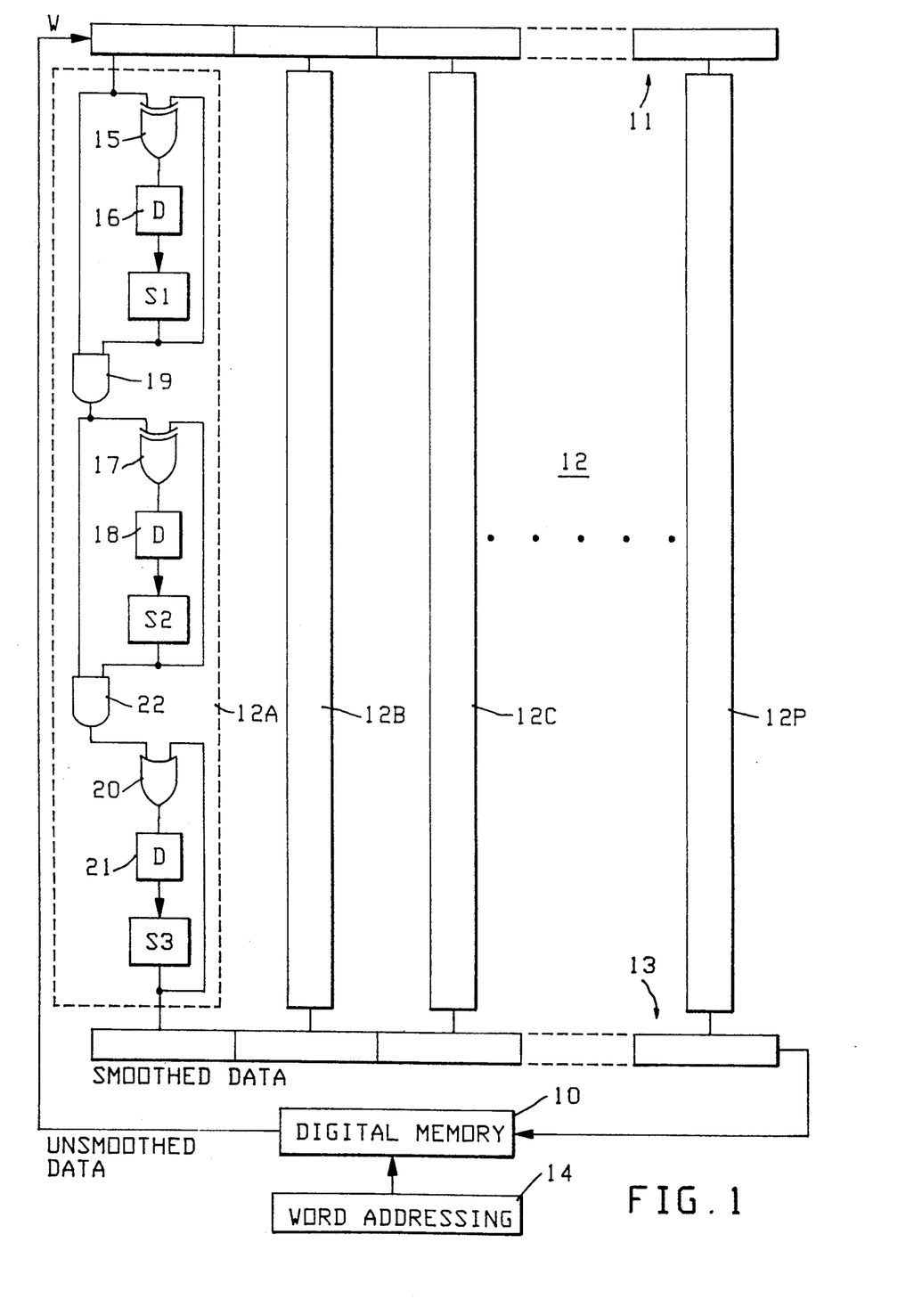
FIG. 1 is a schematic block diagram of a hardware representation of the software embodiment of the present invention.

Referring to FIG. 1, a hardware equivalent of the above-described software embodiment of the invention is illustrated. A digital memory 10 provides storage for the 65,536 16 bit words to be processed as described above. A 16 bit word W to be processed is entered into a 16 bit register 11. The word is accumulated into processing circuitry 12 and the result is entered into a 16 bit register 13. The processed word in the register 13, representing the smoothed data, is entered into the digital memory 10 to replace the unsmoothed data word W. Word addressing circuitry 14 addresses the memory 10 to provide the appropriate words for accumulation as described above with respect to the software embodiment. Control circuitry (not shown) shifts the words in the register 11, in the manner described above, to provide appropriate accumulation. The word addressing circuitry 14 controls the memory 10 to provide the appropriate boundary correction bits, as described above.

The processing circuitry 12 comprises sixteen three-stage counters 12A through 12P intercoupling the respective stages of the registers 11 and 13. The counters 12A through 12P are identical with respect to each other, the details of the counter being illustrated at 12A. The three stages of each of the counters are denoted as S1, S2 and S3 corresponding to the similarly denoted registers described above with respect to the software embodiment. The logic illustrated intercoupling the stages of the counter 12A implements Equations (1) above.

The input to the counter 12A is provided from a corresponding stage of the register 11 and is applied as an input to an EXCLUSIVE OR gate 15. The other input to the EXCLUSIVE OR gate 15 is provided by the output of the stage S1. The output of the EXCLUSIVE OR gate 15 through a delay 16 provides the input to the stage S1. The stages S1, S2 and S3 are conventional storage elements such as D-type flip-flops. An EXCLUSIVE OR gate 17 provides the input to stage S2 through a delay 18. The output of the stage S2 provides an input to the gate 17. The other input to the gate 17 is provided by an AND gate 19. The AND gate 19 performs carry propagation and receives inputs from the stage of the register 11 and the output of S1. An OR gate 20 provides the input to the stage S3 (most significant stage of counter 12A) through a delay 21 and receives an input from the output of the stage S3. The other input to the OR gate 20 is provided by a carry propagation AND gate 22. The AND gate 22 receives inputs from the output of the AND gate 19 and the output of the stage S2. The output of the stage S3 provides the smoothed accumulated SUM digit to the corresponding stage of the register 13.

Figure 2:
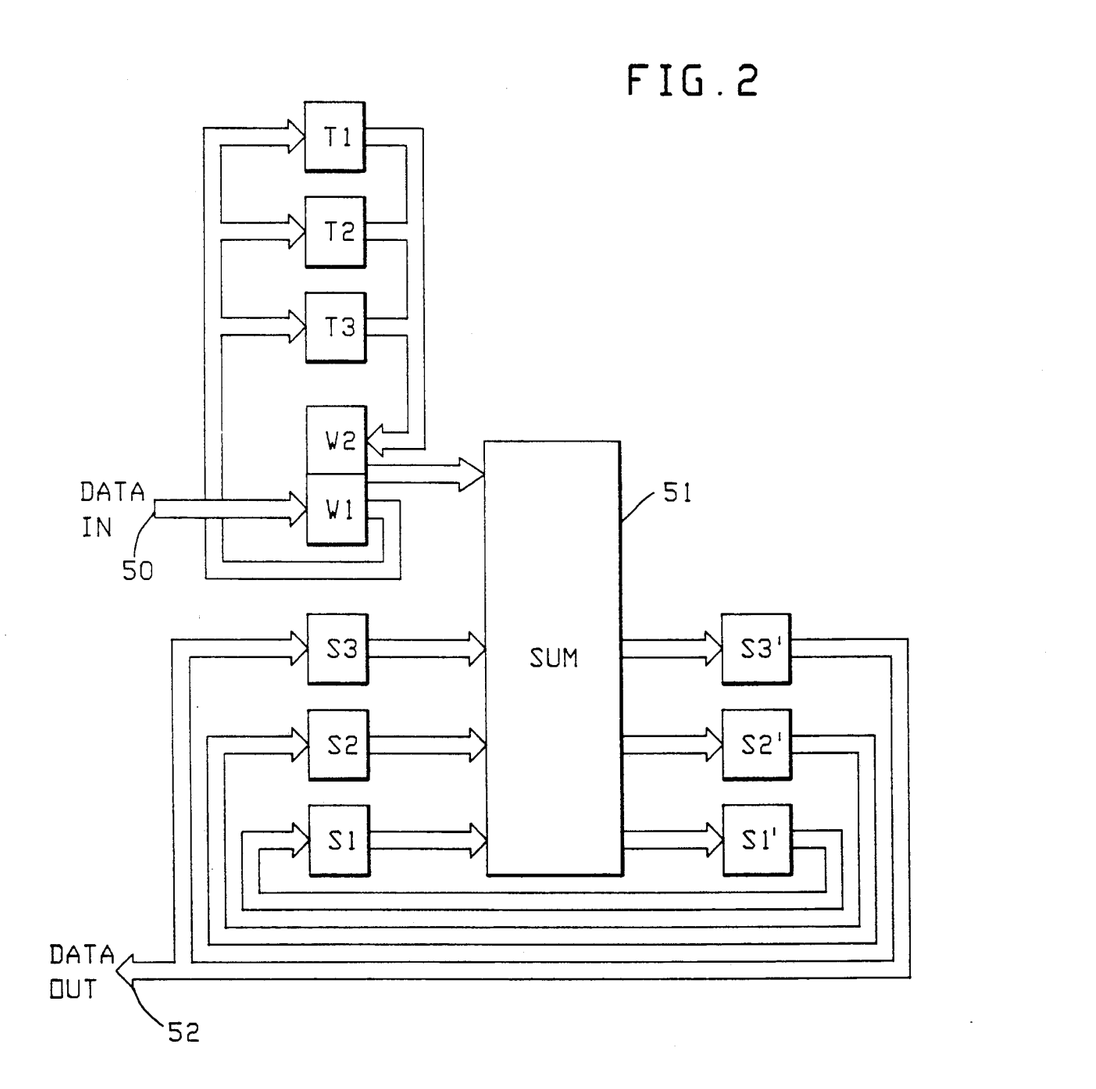
FIG. 2 is a schematic block diagram of a hardware embodiment of the present invention.

FIG. 2 illustrates a hardware embodiment of the present invention. Timing signals for the circuit of FIG. 2 are provided by the timing circuitry of FIG. 3. Details of SUM circuit 51 of FIG. 2 are illustrated in FIG. 4. It is appreciated that the SUM circuit of FIG. 4 implements Equations (1). The circuit of FIG. 4 is replicated sixteen times for the respective 16 bits of the words being processed.

Figure 3:
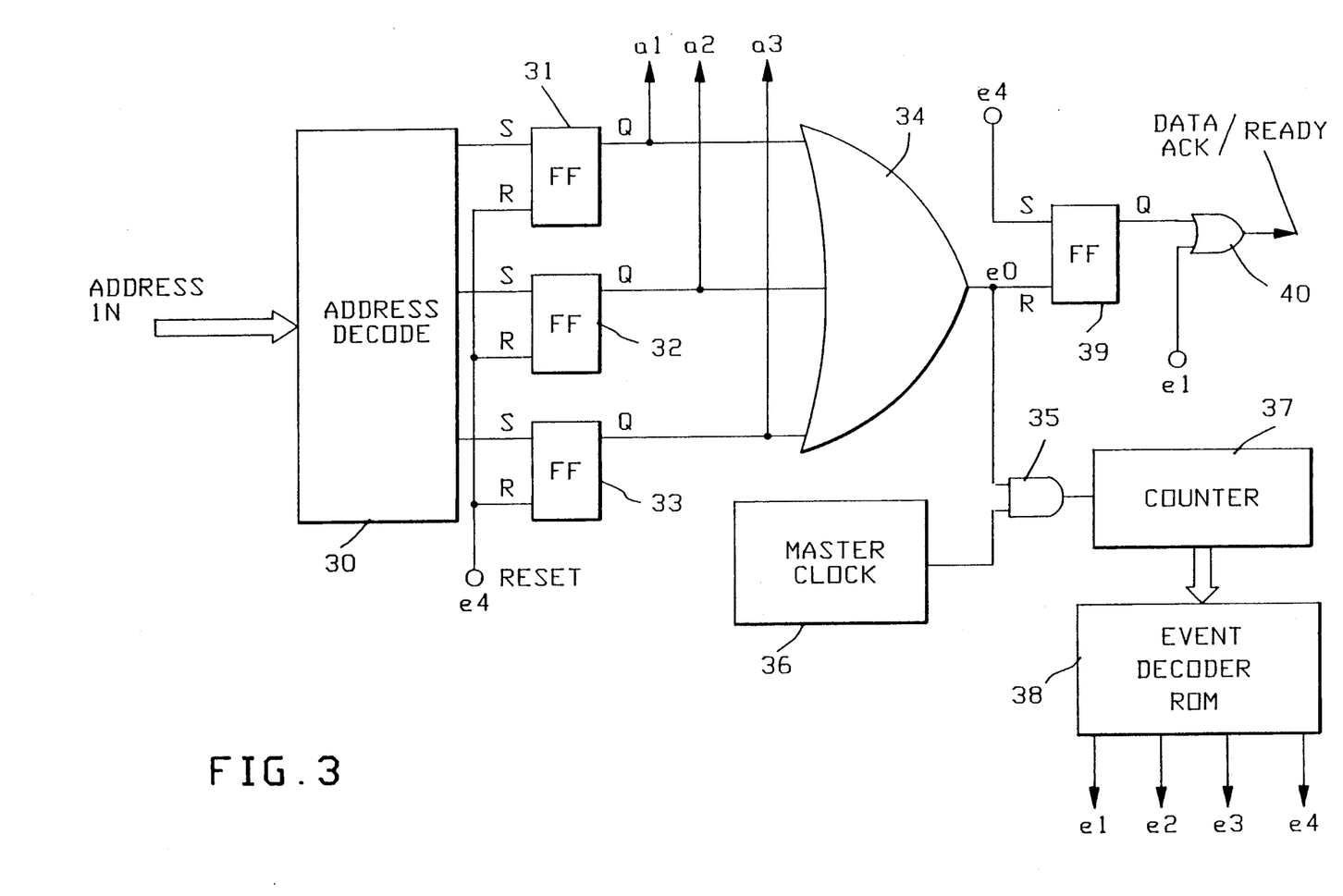
FIG. 3 is a schematic block diagram of a circuit for generating the timing for the apparatus of FIG. 2.
Figure 4:
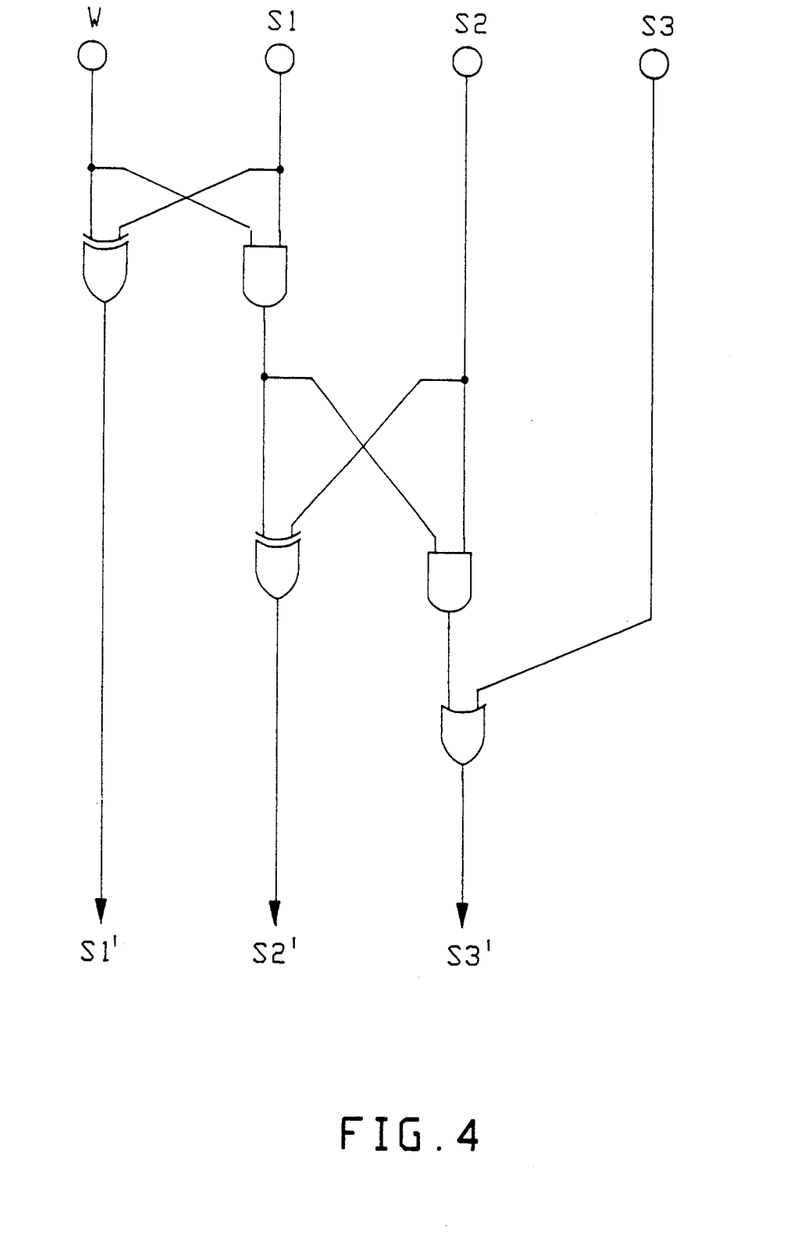
FIG. 4 is a schematic logic diagram of the SUM circuit of FIG. 2.

Referring to FIGS. 2, 3 and 4, the digital image is stored in a digital memory (not shown) addressable by a computer (not shown). In order to smooth a word of data, the computer sequentially fetches three words from three adjacent lines in the image, as explained above, and sequentially processes these words. The address of the word being processed is applied to an address decode circuit 30 (FIG. 3) and the data word under processing is applied at a DATA IN port 50 (FIG. 2). Depending on the address, the address decode circuit 30 sets one of three flip-flops 31, 32 or 33 to provide corresponding timing signals a1, a2 or a3, respectively. The timing signals a1, a2 and a3 are applied as inputs to an OR gate 34 to form a timing signal e0. The e0 timing signal is applied as an input to an AND gate 35 which receives an input from master clock 36. Master clock pulses are enabled through the AND gate 35 by e0 into a counter 37. An event decoder ROM 38 coupled to the output of the counter 37, provides further timing signals e1, e2, e3 and e4. The e4 signal is applied to the set input of a flip-flop 39 which receives the e0 signal at the reset input thereof. The Q output of the flip-flop 39 together with the e1 signal are applied to an OR gate 40. In this manner, e1 provides a data acknowledgment signal to the computer and e4 provides a data ready for output (output acknowledge) signal. In a manner to be described, the timing signals a1, a2 and a3 are combined with the timing signals e1, e2, e3 and e4 to provide signals to control the occurrences of events of the circuit of FIG. 2.

The circuit of FIG. 2 includes word length buffer registers T1, T2, T3, W1, W2, S1, S2, S3, S1', S2' and S3'. The registers W1 and W2 are word length parallel-in, parallel-out shift registers that are concatenated into a W1:W2 double word shift register. The word under processing applied at the DATA IN port 50 is entered into W1. The circuit of FIG. 2 includes SUM circuit 51 which receives inputs from W1:W2, S1, S2 and S3. The SUM circuit 51 provides outputs to S1', S2' and S3'. As described above, the SUM circuit 51 includes 16 logic arrangements as illustrated in FIG. 4 for the 16 bits of the words under processing, respectively. The output of W1:W2 to SUM 51 are the two lowest significant bits of W2 and all but the two lowest significant bits of W1. The registers T1, T2 and T3 are utilized for temporary storage to save bits from the prior word of each line permitting for smooth overlap across word boundaries.

The use of such temporary storage eliminates utilizing two inputs to process each word. The smoothed word is returned to image storage from S3' via a DATA OUTPUT port 52.

In order to utilize the hardwired module illustrated in FIGS. 2–4, three words are fetched from three adjacent lines in the image and applied sequentially to port 50 with the corresponding addresses applied to address decode 30. The smoothed word from the hardwired module is returned to the image buffer.

The circuitry of FIG. 3 times the occurrences of the events of FIG. 2 as follows:

(1) A valid input address sets one of the flip-flops 31, 32 or 33 via the address decode circuitry 30 to provide the signal a1, a2 or a3.

(2) The e0 pulse (a1+a2+a3) enables the input to W1, resets the counter 37 and enables the master clock 36 to pass master clock pulses through the AND gate 35 to the counter 37. Logic (not shown) forms e0×a1, e0×a2 or e0×a3 to enable the output from T1, T2 or T3, respectively, to W2.

(3) The pulse e1 provides data acknowledgment to the computer via the OR gate 40. Logic (not shown) forms e1×a1, e1×a2, or e1×a3 to enable the output from W1 to T1, T2 or T3, respectively.

(4) The pulse e2 enables outputs of W1:W2, S1 S2, S3 to SUM 51 and inputs of S1', S2', S3'.

(5) The pulse e3 enables outputs of S1', S2', S3', enables inputs of S1, S2, S3 and shifts W1:W2 one bit.

(6) Repeats event #(4) e2 pulse.

(7) Repeats event #(5) e3 pulse.

(8) Repeats event #(4) e2 pulse.

(9) Repeats event #(5) e3 pulse.

(10) The pulse e4 provides the signal designating data ready for output (output acknowledge) and resets flip-flops 31, 32 and 33.

With continued reference to FIG. 3, the counter 37 and event decoder ROM 38 form an event counter to schedule the above-described events. The counter 37 is a four bit counter with timing as follows:

$e0 = 1$ at 0000

$e1 = 1$ at 0010.

$e2 = 1$ at 0100, 1000, 1100

$e3 = 1$ at 0110, 1010, 1110

$e4 = 1$ at 1111

It is appreciated that buffer enable lines should be skewed to turn off before the outputs driving the inputs to the buffer.

It is appreciated that the addressing of the words is performed such that the three words processed to smooth a word correspond to the signals a1, a2, and a3. Thus by the logic described above, the appropriate words are processed by the circuit of FIG. 2 and appropriate words are stored in temporary registers T1, T2 and T3 for boundary correction.

The hardwired logic implementation illustrated in FIGS. 2–4 has the benefits of the ability to process pre-stored image data and higher speed than total software processing. The speed relative to total software processing is approximately a factor of four for 4 out of 9 smoothing and approximately a factor of eight for 5 out of 9 smoothing utilizing the Interdata 70 minicomputer. These factors are in addition to the speed advantage discussed above with respect to the word oriented software smoothing algorithm.

It is appreciated from the foregoing, that the word oriented processing technique can be at least an order of magnitude faster than prior art techniques for image smoothing that examine each pixel environment one at a time. The invention performs image smoothing on a binary image or an appropriately formatted gray scale image.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for smoothing a two-dimensional image represented by a matrix of pixels arranged in a plurality of adjacent scan lines, each said pixel having a predetermined neighborhood of adjacent pixels defining adjacent neighboring pixels, said matrix of pixels being represented by a sequence of digitally stored words having N bits each, each said bit representing a corresponding pixel of said matrix, comprising register means having N bit positions for holding an N-bit word, N counter means coupled to said N bit positions of said register means, respectively, for accumulating the number of ONEs existing in said N bit positions of said register means, respectively, each said counter means comprising a plurality of counter stages including a most significant stage, said N counter means thereby including most significant stages, respectively, each said counter means being constructed and arranged so that said most significant stage thereof goes to ONE when said counter means has accumulated a predetermined number of ONEs and remains at ONE irrespective of further accumulation of ONEs, and control means operative to load a word under examination into said register means, said word under examination being N pixels under examination, said control means being further operative to load further words into said register means representing N pixels adjacent said N pixels under examination on scan lines adjacent said N pixels under examination, said control means being further operative to shift said word under examination and said further words, said control means being operative such that said word under examination and said further words are sequentially loaded into and shifted in said register means one word at a time so that ONEs representing said N pixels under examination and said adjacent neighboring pixels thereof are simultaneously accumulated in said N counter means, respectively, with said most significant stages of said N counter means containing a smoothed word corresponding to said word under examination.

2. The apparatus of claim 1 wherein said predetermined number of ONEs is equal to the number of pixels comprising the majority of a pixel under examination plus said adjacent neighboring pixels thereof.

3. The apparatus of claim 1 wherein said predetermined neighborhood comprises a square neighborhood and said adjacent neighboring pixels comprise 8 pixels adjacent a pixel under examination within said square neighborhood.

4. The apparatus of claim 1 wherein each said counter
an exclusive OR gate for providing an input to each said counter stage except for said most significant stage, and
an OR gate for providing an input to said most significant stage.

5. The apparatus of claim 1 wherein said word under examination is on a particular scan line and said control means is further operative to shift bits of a word adjacent said word under examination on said particular scan line when said control means is operative to shift said word under examination so that said bits of said word adjacent said word under examination remain adjacent said word under examination when said word under examination is shifted so that correct data are accumulated at boundaries of said word under examination.

6. A method for smoothing a two-dimensional image represented by a matrix of pixels arranged in a plurality of adjacent scan lines, each said pixel having a predetermined neighborhood of adjacent pixels defining adjacent neighboring pixels, said matrix of pixels being represented by a sequence of digitally stored words having N bits each, each said bit representing a corresponding pixel of said matrix, comprising
holding an N-bit word in a register having N bit positions,
accumulating the number of ONEs existing, respectively, in said N bit positions of said register in N counters, respectively,
each said counter comprising a plurality of counter stages including a most significant stage, said N counters thereby including most significant stages, respectively,
setting said most significant stage of each said counter to ONE when said counter has accumulated a predetermined number of ONEs, said most significant stage remaining at ONE irrespective of further accumulation of ONEs,
loading a word under examination into said register, said word under examination being a word to be smoothed and representing N pixels under examination,
loading further words into said register representing N pixels adjacent said N pixels under examination on scan lines adjacent said N pixels under examination, and
shifting said word under examination and said further words,
said word under examination and said further words being sequentially loaded into and shifted in said register, one word at a time so that ONEs representing said N pixels under examination and said adjacent neighboring pixels thereof are simultaneously accumulated in said N counters, respectively, with said most significant stages of said N counters containing a smoothed word corresponding to said word under examination.

7. The method of claim 6 further including the step of defining said predetermined number of ONEs as equal to the number of pixels comprising the majority of a pixel under examination plus said adjacent neighboring pixels thereof.

8. The method of claim 6 further including the step of defining said predetermined neighborhood as a square neighborhood and said adjacent neighboring pixels as eight pixels adjacent pixel under examination within said square neighborhood.

9. The method of claim 6 wherein said word under examination is on a particular scan line and said method further includes shifting bits of a word adjacent said word under examination on said particular scan line when shifting said word under examination so that said bits of said word adjacent said word under examination remain adjacent said word under examination when said word under examination is shifted so that correct data are accumulated at boundaries of said word under examination.

* * * * *